April 17, 1934.    K. BLEY    1,955,048
DEVICE FOR INSERTING THE PISTON PIN IN THE PISTON AND PISTON ROD
Filed July 11, 1933
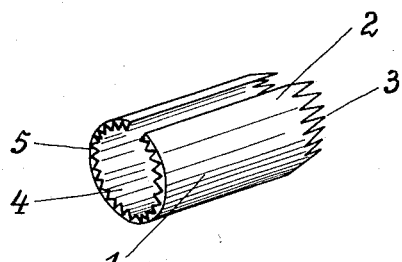
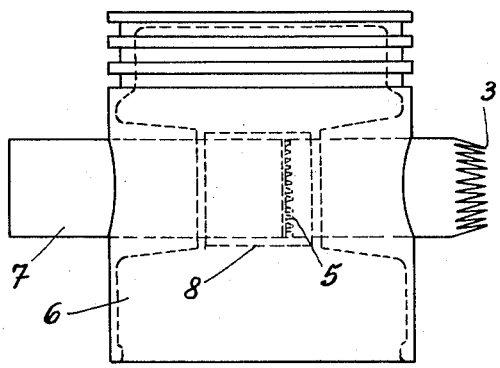
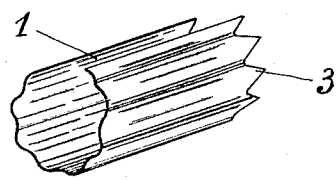
INVENTOR Patented Apr. 17, 1934

1,955,048

UNITED STATES PATENT OFFICE 1,955,048

DEVICE FOR INSERTING THE PISTON PIN IN THE PISTON AND PISTON ROD

Kurt Bley, Magdeburg, Germany

Application July 11, 1933, Serial No. 679,909
In Germany September 21, 1932

3 Claims. (Cl. 29—88.2)

Hitherto the piston pins, for example in the case of light metal pistons for engines, were inserted in such a manner that the pistons were heated and the pins shrunk in.

This was, however, mostly difficult when the pin could not be quickly pushed through, because the bearing bush of the piston rod, through which the pin must also be pushed, cannot always be held absolutely axially in alignment with the piston eyes. The pin is then jammed in the first eye and could be driven in only by force.

This invention relates to an auxiliary device for overcoming this objection. This device consists of a resilient sheet steel plate bent in cylindrical shape. The front end is tapered in order to facilitate the insertion of the cylindrical plate; the piston pin bears against the other end.

When fitting the pin, the resilient rolled plate is first inserted in the bore so that it bears against the inner wall of the piston eyes and of the piston rod bush, thereby bringing and holding the bores thereof in axial alignment. Conically bent teeth of the plate facilitate the insertion in the bores. The pin can then be easily inserted in that the pin pushes the plate in front of it.

Two embodiments of the invention are illustrated by way of example in the accompanying drawing in which:—

Fig. 1 is a perspective view of the device.

Fig. 2 shows the device in use.

Fig. 3 shows the device made of corrugated sheet metal.

The device consists of a piece of resilient sheet metal 1, which is bent to form an open cylinder substantially as illustrated in the drawing. The front end 2 is dented and the teeth 3 are conically bent inwards. On the rear end 4 short teeth 5 are provided which are inwardly bent at right angles and form an abutment against which the piston pin 7 bears.

Fig. 2 shows how the piston pin 7 is inserted in the piston 6. The pin bears against the small teeth 5 of the plate and pushes the plate through the bearing bush 8 of the piston rod and the second piston eye.

Fig. 3 shows the device made of a corrugated sheet metal plate 1. In this construction the teeth 5 on the rear end are not necessary because the corrugation of the plate offers a sufficient abutment surface for the pin. The teeth 3 on the front end may be produced by oblique grinding.

I claim:—

1. A device for inserting the piston pin in the piston and piston rod, comprising a resilient curved plate forming a hollow cylinder having an abutment surface for the piston pin on one end and tapered at the other end.

2. A device for inserting the piston pin in the piston and piston rod, comprising in combination a plate of smooth sheet steel forming a hollow cylinder, inwardly bent teeth on the rear end of said plate, and teeth on the front end of said plate inwardly bent in conical shape.

3. A device for inserting the piston pin in the piston and piston rod, comprising a cylindrically curved plate of corrugated sheet metal forming a hollow cylinder and oblique teeth on the front end of said plate.

KURT BLEY.